9382X
M. Tuell,
Wood Planing Machine.
Patented Feb. 10, 1836.
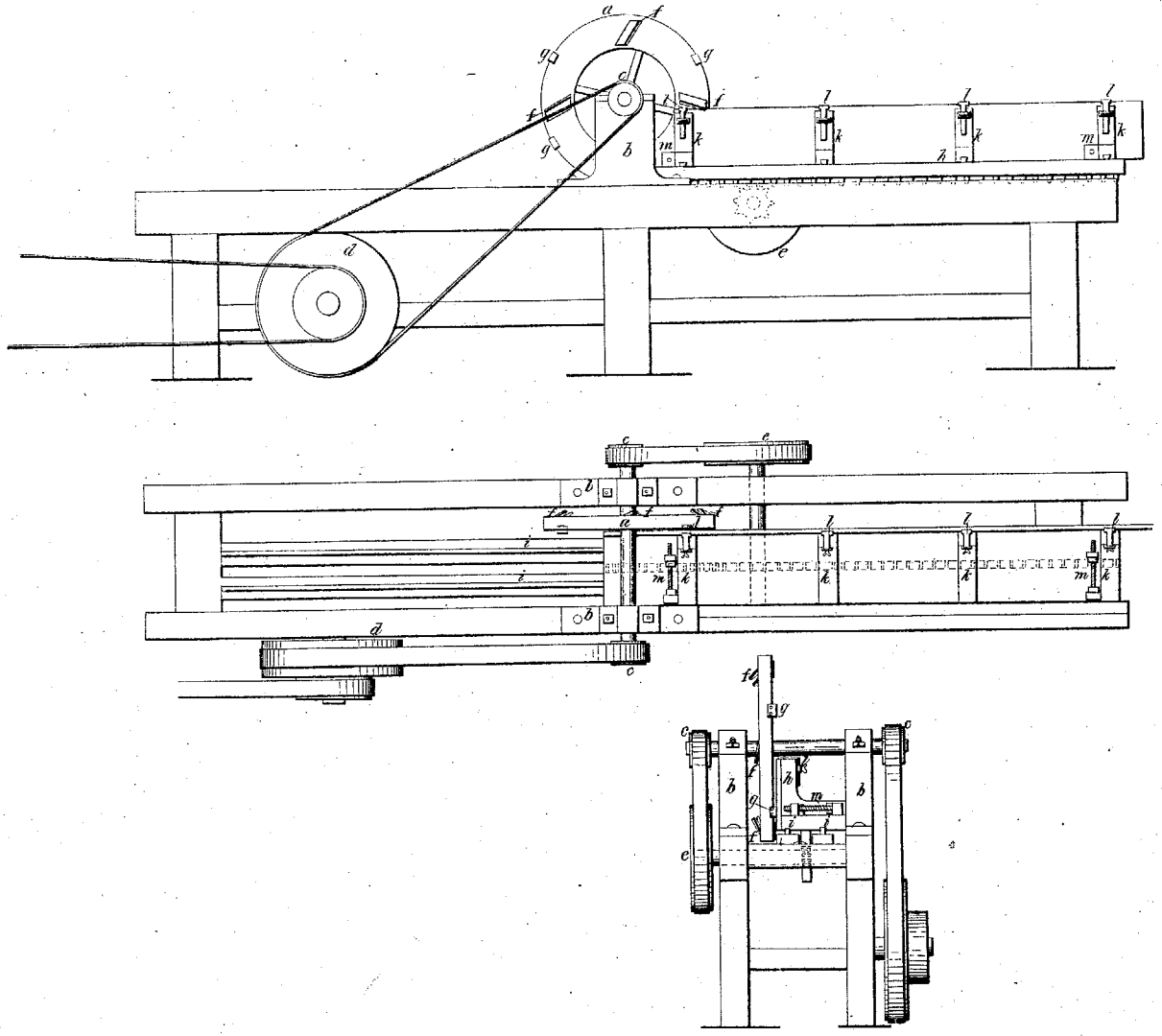
AM. PHOTO-LITHO. CO. N.Y. (OSBORNE'S PROCESS)

Melzar Tuells of Milo New York.
Letters Patent.

The schedule referred to in these Letters Patent and making part
of the same containing a description in the words of the said Mel
zar Tuells himself of his improvement in the machine for plain
ing and dressing Boards.

To all to whom these presents shall come Be it known
that I Melzar Tuells of the Town of Milo in the County of
Yates and State of New York have invented a new and useful im
provement in planing and dressing boards and that the fol-
lowing is a full and exact description of the construction &
operation of the said machine as invented or improved by me
to wit. A frame proportioned to the length and breadth of the
boards, to be plained with four strong pieces running the whole
length, to be placed on six posts with six cross girts. a wheel
to be made of wood or cast iron proportioned to the width
of the stuff to be plained. to be placed on the top of the frame
and running on two upright head blocks, with two pullys on
the shaft of the wheel one for a strap or band running around
a drum to propel the wheel; the other for a strap or band
running around a drum for the purpose of moving the carriag.
on the face of the wheel at equal distances from each other is pla
ced four or more bits from one to two inches in width to be of
double or single irons, and placed at an acute angle with the face
of the wheel on the [illegible] edge of the wheel and [illegible]
before the bits are four or more tools with a sharp edge on
the side which are for the purpose of doing the coarse dres-
sing of the stuff. In front of the wheel is a carriage running
on the top of the frame on wood or iron ways, and on the ca-
rriage four or more upright stops with iron dogs for the pur
pose of holding the boards. On the top of the carriage are two
screws for the purpose of setting the carriage to or from the whee the said carriage to be made of wood and of the length of the staff to be dres-
sed. The boards or stuff to be plained are to be placed on
the edge and against the stops and fastened by the iron dogs
to the stops. The carriage is to be moved by means of cog
wheels mashing underneath or with a chain. The above descri-
bed machine to be propelled by either hand, steam, horse, or
water power Exd. W.C.

Witnesses
Henry Emo
Alex: Cleveland

Melzer Tuells (481 words)

Drawing made.